(12) United States Patent
Mayyuri et al.

(10) Patent No.: US 12,231,302 B2
(45) Date of Patent: Feb. 18, 2025

(54) ZONE-BASED FEDERATED LEARNING

(71) Applicant: QUALCOMM Technologies, Inc., San Diego, CA (US)

(72) Inventors: Vijaya Datta Mayyuri, San Diego, CA (US); An Chen, San Diego, CA (US)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 18/452,492

(22) Filed: Aug. 18, 2023

(65) Prior Publication Data
US 2023/0396514 A1 Dec. 7, 2023

Related U.S. Application Data

(62) Division of application No. 17/359,118, filed on Jun. 25, 2021, now Pat. No. 11,777,812.

(51) Int. Cl.
*H04L 41/16* (2022.01)
*G06F 18/214* (2023.01)
*H04W 8/18* (2009.01)
*H04W 8/20* (2009.01)
*H04W 8/24* (2009.01)

(52) U.S. Cl.
CPC .......... *H04L 41/16* (2013.01); *G06F 18/2148* (2023.01); *H04W 8/186* (2013.01); *H04W 8/20* (2013.01); *H04W 8/245* (2013.01)

(58) Field of Classification Search
CPC .... G06F 18/2148; G06N 3/045; G06N 3/063; G06N 3/084; G06N 3/0455; H04L 41/16; H04W 8/186; H04W 8/20; H04W 8/245
See application file for complete search history.

(56) References Cited

U.S. PATENT DOCUMENTS

| | | | |
|---|---|---|---|
| 10,666,342 B1 | 5/2020 | Landis et al. | |
| 10,699,189 B2 | 6/2020 | Lie et al. | |
| 11,412,521 B1 | 8/2022 | Sundararajan et al. | |
| 11,836,583 B2 * | 12/2023 | Chu | G06N 3/045 |
| 2012/0023043 A1 | 1/2012 | Cetin et al. | |
| 2012/0226866 A1 | 9/2012 | Bozek et al. | |

(Continued)

OTHER PUBLICATIONS

International Search Report and Written Opinion—PCT/US2022/034957—ISA/EPO—Jan. 11, 2023.

(Continued)

*Primary Examiner* — Stephen J Clawson
(74) *Attorney, Agent, or Firm* — Seyfarth Shaw LLP

(57) ABSTRACT

A method for managing model updates by a first zone server, associated with a first zone model of a plurality of zone models, includes receiving a global model from a global server associated with the global model. The method also includes transmitting the global model to user equipment (UEs) in a first group of UEs associated with the first zone model. The method further includes receiving, from one or more UEs in the first group, model updates associated with the global model based on transmitting the global model. The method further includes transmitting, to the global server, an average of the model updates received from the one or more UEs. The method also includes updating the global model to generate the first zone model based on the model updates. The method further includes transmitting the first zone model to one or more UEs in the first group.

18 Claims, 12 Drawing Sheets

(56) References Cited

U.S. PATENT DOCUMENTS

| | | | |
|---|---|---|---|
| 2015/0271727 A1 | 9/2015 | Harrang | |
| 2018/0107925 A1 | 4/2018 | Choi et al. | |
| 2018/0107926 A1 | 4/2018 | Choi et al. | |
| 2019/0138934 A1 | 5/2019 | Prakash et al. | |
| 2020/0017117 A1* | 1/2020 | Milton | G08G 1/0112 |
| 2020/0285980 A1* | 9/2020 | Sharad | G06N 20/20 |
| 2020/0314827 A1 | 10/2020 | Ge et al. | |
| 2020/0351344 A1* | 11/2020 | Das Gupta | H04L 41/16 |
| 2021/0042628 A1 | 2/2021 | Zhou et al. | |
| 2021/0143883 A1 | 5/2021 | Yerramalli et al. | |
| 2021/0150037 A1* | 5/2021 | Radhakrishnan | G06F 21/602 |
| 2021/0160812 A1 | 5/2021 | Manolakos et al. | |
| 2021/0166111 A1* | 6/2021 | Knighton, Jr. | G06N 3/084 |
| 2021/0166157 A1* | 6/2021 | Bhowmick | G06N 20/20 |
| 2021/0203565 A1* | 7/2021 | Arora | G06N 5/04 |
| 2021/0312336 A1* | 10/2021 | Sinn | G06N 3/084 |
| 2021/0329522 A1 | 10/2021 | Li et al. | |
| 2021/0376895 A1 | 12/2021 | Xue et al. | |
| 2021/0390434 A1 | 12/2021 | Bai et al. | |
| 2022/0007382 A1* | 1/2022 | Anand | G06N 3/08 |
| 2022/0101131 A1 | 3/2022 | Taherzadeh Boroujeni et al. | |
| 2022/0150727 A1 | 5/2022 | Pezeshki et al. | |
| 2022/0188594 A1 | 6/2022 | Babaheidarian | |
| 2022/0248312 A1 | 8/2022 | Bai et al. | |
| 2022/0294548 A1 | 9/2022 | Pezeshki et al. | |
| 2022/0377844 A1 | 11/2022 | Kumar et al. | |
| 2022/0400373 A1 | 12/2022 | Zhu et al. | |
| 2022/0414464 A1* | 12/2022 | Krishnaswamy | G06N 3/047 |
| 2022/0417108 A1 | 12/2022 | Mayyuri et al. | |
| 2023/0036702 A1* | 2/2023 | Reisser | G06N 3/045 |
| 2023/0385652 A1* | 11/2023 | Zhu | G06N 20/00 |

OTHER PUBLICATIONS

Luo S., et al., "HFEL: Joint Edge Association and Resource Allocation for Cost-Efficient Hierarchical Federated Edge Learning", IEEE Transactions on Wireless Communications, vol. 19, No. 10, Jun. 26, 2020, XP011814035, pp. 6535-6548, figures 1, 2 sections II and III.

Partial International Search Report—PCT/US2022/034957—ISA/EPO—Nov. 14, 2022.

Yu Z., et al., "Mobility-Aware Proactive Edge Caching for Connected Vehicles Using Federated Learning", IEEE Transactions on Intelligent Transportation Systems, vol. 22, No. 8, Aug. 31, 2020, XP011871215, pp. 5341-5351, figures 1, 2, section IV-A.

* cited by examiner

ZONE-BASED FEDERATED LEARNING

CROSS-REFERENCE TO RELATED APPLICATION

The present application is a divisional of U.S. patent application Ser. No. 17/359,118, filed on Jun. 25, 2021, and titled "ZONE-BASED FEDERATED LEARNING," the disclosure of which is expressly incorporated by reference in its entirety.

FIELD OF THE DISCLOSURE

Aspects of the present disclosure generally relate to wireless communications, and more particularly to techniques and apparatuses for zone-based federated learning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunication system (UMTS) mobile standard promulgated by the Third Generation Partnership Project (3GPP).

A wireless communication network may include a number of base stations (BS s) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different UEs to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. A deep neural network may be an example of an artificial neural network. Deep neural networks may improve privacy or implement Internet of Things (IoT) services. In some examples, a deep neural network may be trained in a decentralized manner. As an example, the deep neural network may be trained in multiple edge devices, such as a mobile device, where local data samples may be specified as training data. It may be desirable to customize deep neural networks based on inherent similarities and differences found among the edge devices specified for training.

SUMMARY

In one aspect of the present disclosure, a method for managing model updates by a first network device includes receiving, at the first network device associated with a first zone model of a number of zone models, a global model from a second network device associated with the global model. The method further includes transmitting, from the first network device, the global model to UEs in a first group of UEs associated with a first zone model. In some examples, a different group of UEs may associated with each of the number of zone models. The method still further includes receiving, at the first network device, weights associated with the global model from each UE in the first group. The method also includes updating, at the first network device, the first zone model based on the received weights. The method further includes transmitting, from the first network device, the updated first zone model to each UE in the first group.

Another aspect of the present disclosure is directed to an apparatus for managing model updates at a first network device. The apparatus includes means for receiving, at the first network device associated with a first zone model of a number of zone models, a global model from a second network device associated with the global model. The apparatus further includes means for transmitting, from the first network device, the global model to UEs in a first group of UEs associated with the first zone model. In some examples, a different group of UEs may associated with each of the number of zone models. The apparatus still further includes means for receiving, at the first network device, weights associated with the global model from each UE in the first group. The apparatus also includes means for updating, at the first network device, the first zone model based on the received weights. The apparatus further includes means for transmitting, from the first network device, the updated first zone model to each UE in the first group.

In another aspect of the present disclosure, a non-transitory computer-readable medium with non-transitory program code recorded thereon for managing model updates at a first network device is disclosed. The program code is executed by a processor and includes program code to receive, at the first network device associated with a first zone model of a number of zone models, a global model from a second network device associated with the global model. The program code further includes program code to transmit, from the first network device, the global model to UEs in a first group of UEs associated with a first zone model. In some examples, a different group of UEs may associated with each of the number of zone models. The program code still further includes program code to receive, at the first network device, weights associated with the global model from each UE in the first group. The program code also includes program code to update, at the first network device, the first zone model based on the received weights. The program code further includes program code to transmit, from the first network device, the updated first zone model to each UE in the first group.

Another aspect of the present disclosure is directed to an apparatus for managing model updating at a first network device. The apparatus includes a processor; a memory coupled with the processor; and instructions stored in the memory and operable, when executed by the processor, to cause the apparatus to receive, at the first network device associated with a first zone model of a number of zone models, a global model from a second network device associated with the global model. Execution of the instructions further cause the apparatus to transmit, from the first network device, the global model to UEs in a first group of UEs associated with a first zone model. In some examples, a different group of UEs may associated with each of the number of zone models. Execution of the instructions also cause the apparatus to receive, at the first network device, weights associated with the global model from each UE in the first group. Execution of the instructions still further cause the apparatus to update at the first network device, the first zone model based on the received weights. Execution of the instructions further cause the apparatus to configured to transmit, from the first network device, the updated first zone model to each UE in the first group.

In one aspect of the present disclosure, a method for training models performed at a UE includes receiving, at the first UE associated with a first group of UEs, a first model from a first network device associated with a first zone model of a number of zone models. In some examples, the first group of UEs is associated with a first zone model, and a different group of UEs are associated with each of the number of zone models. The method further includes identifying, at the first UE, a network device for training the first model based on one or both of a current connectivity state of the UE or a current resource use of the UE. The method still further includes transmitting, to the first network device, model weight updates based on the training of the first model. The method also includes receiving, from the first network device, the first zone model based on the transmitted model weights updates.

Another aspect of the present disclosure is directed to an apparatus for training models at a UE. The apparatus includes means for receiving, at the first UE associated with a first group of UEs, a first model from a first network device associated with a first zone model of a number of zone models. In some examples, the first group of UEs is associated with a first zone model, and a different group of UEs are associated with each of the number of zone models. The apparatus further includes means for identifying, at the first UE, a network device for training the first model based on one or both of a current connectivity state of the UE or a current resource use of the UE. The apparatus still further includes means for transmitting, to the first network device, model weight updates based on the training of the first model. The apparatus also includes means for receiving, from the first network device, the first zone model based on the transmitted model weights updates.

In another aspect of the present disclosure, a non-transitory computer-readable medium with non-transitory program code recorded thereon for training models at a UE is disclosed. The program code is executed by a processor and includes program code to receive, at the first UE associated with a first group of UEs, a first model from a first network device associated with a first zone model of a number of zone models. In some examples, the first group of UEs is associated with a first zone model, and a different group of UEs are associated with each of the number of zone models. The program code further includes program code to identify, at the first UE, a network device for training the first model based on one or both of a current connectivity state of the UE or a current resource use of the UE. The program code still further includes program code to transmit, to the first network device, model weight updates based on the training of the first model. The program code also includes program code to receive, from the first network device, the first zone model based on the transmitted model weights updates.

Another aspect of the present disclosure is directed to an apparatus for training models at a UE. The apparatus includes a processor; a memory coupled with the processor; and instructions stored in the memory and operable, when executed by the processor, to cause the apparatus to receive, at the first UE associated with a first group of UEs, a first model from a first network device associated with a first zone model of a number of zone models. In some examples, the first group of UEs is associated with a first zone model, and a different group of UEs are associated with each of the number of zone models. Execution of the instructions further cause the apparatus to identify, at the first UE, a network device for training the first model based on one or both of a current connectivity state of the UE or a current resource use of the UE. Execution of the instructions still further cause the apparatus to transmit, to the first network device, model weight updates based on the training of the first model. Execution of the instructions also cause the apparatus to receive, from the first network device, the first zone model based on the transmitted model weights updates.

According to another aspect of the present disclosure, a non-transitory computer readable medium storing program code for wireless communications by a BS includes program code to determine a timing condition for a UE. The base station also includes program code to transmit a number of HP grants for scheduling a number of HP uplink transmissions in a slot. The base station also includes program code to transmit a LP grant for scheduling an LP uplink transmission in the slot. The LP uplink transmission overlaps one or more of the number of HP uplink transmissions in the slot. A time between one of the number of HP grants and one of the HP uplink transmissions overlapping the scheduled LP uplink transmission satisfying the timing condition. The base station further includes program code to receive a multiplexed communication during one of the scheduled HP uplink transmissions.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
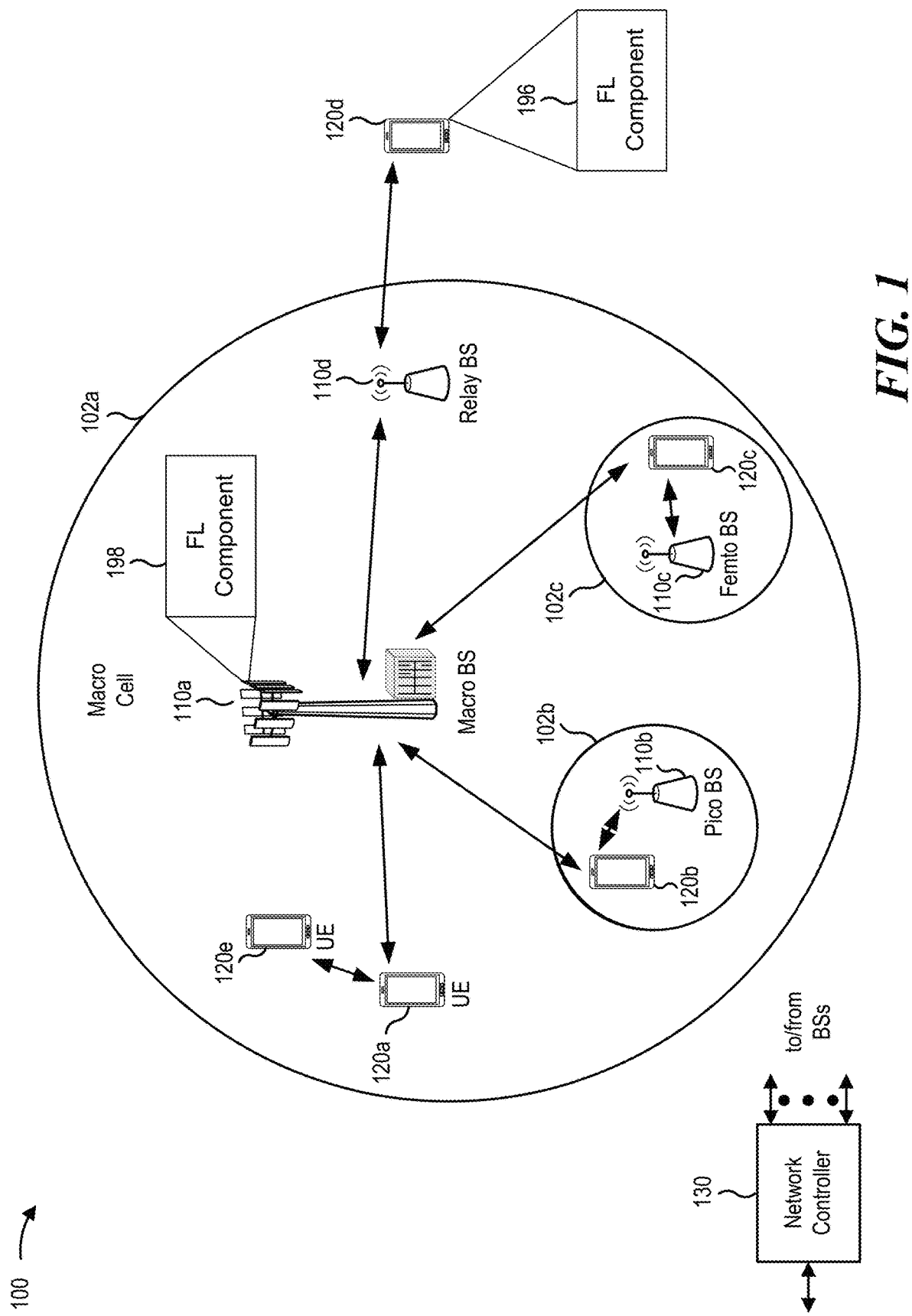
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described below using terminology commonly associated with 5G and later wireless technologies, aspects of the present disclosure can be applied in other generation-based communications systems, such as and including 3G and/or 4G technologies.

As described, a machine learning model may be trained in a decentralized manner. The machine learning model may be an example of a deep neural network. In some examples, the machine learning model may be trained in multiple edge devices, such as a mobile device, where local data samples may be specified as training data. The local data may be collected by the mobile device via device sensors (e.g., positioning sensor, accelerometer, etc.), user input, and/or other methods of collecting data. A system for training the machine learning model in a decentralized manner may be referred to as a federated learning system.

In some examples, the machine learning model may be trained to perform a task, such as typing assistance or vocabulary prediction. In such examples, local data samples may differ based on one or more attributes of the edge devices used for training the machine learning model. These attributes may include, but are not limited to, a geographic location, a default language, or a user interface theme. In the present disclosure, edge devices used for training the machine learning model may be referred to as participating devices or training devices. Aspects of the present disclosure are directed to grouping participating devices based on shared attributes. Each group of participating devices may be associated with a machine learning model of a zone. For example, participating devices may be grouped based on geographic location. In such an example, participating devices in Los Angeles may be grouped together and associated with a first zone and participating devices in New York may be grouped together and associated with a second zone. The machine learning model of a zone may be referred to as a zone model. By grouping participating devices based on inherent similarities or differences, aspects of the present disclosure may improve machine learning models by providing customized machine learning models that are relevant to a given group (e.g., zone).

As an example, a machine learning model may be trained to predict one or more words based on a current word. The predicted words may improve a user's typing speed. In such an example, the machine learning model may learn vocabulary over time. Some of the learned vocabulary may be associated with a geographic location. Thus, a word used in one zone may not be applicable to a word used in a different zone, even if both users in both zones have the same language. Therefore, it may be desirable to customize machine learning models based on nuances associated with a particular zone. In one example, a geographic location associated with a first zone may refer to a beverage as "soda" and another geographic location associated with a second zone may refer to a beverage as "pop." In this example, it may be desirable to customize a first zone model to recognize "soda" as a term for a beverage and also customize a second zone model to recognize "pop" as a term for a beverage.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

In some implementations, a UE 120 may include a federated learning (FL) component 196 for receiving, at the UE 120 associated with a first group of UEs, a first model from the base station 110 associated with a first zone model of a number of zone models. In some examples, the first group of UEs is associated with a first zone model, and a different group of UEs is associated with each of the number of zone models. The method further includes identifying, at the UE 120, a network device for training the first model based on one or both of a current connectivity state of the UE 120 or a current resource use of the UE 120. The method still further includes transmitting, to the first network device, model weight updates based on the training of the first model. The method also includes receiving, from the base station 110, the first zone model based on the transmitted model weights updates. For illustrative purposes, FIG. 1 only shows the FL component 196 of one UE 120d. The FL component 196 may be a component of each UE 120 in FIG. 1. Additionally, the FL component 196 is not limited to UEs 120, other network devices may include an FL component 196.

Additionally, in some implementations, a base station 110 may include a federated learning (FL) component 198 for receiving, at the base station 110 associated with a first zone model of a number of zone models, a global model from a second network device associated with the global model; transmitting, from the base station 110, the global model to UEs 120 in a first group of UEs associated with a first zone model; receiving, at the base station 110, weights associated with the global model from each UE 120 in the first group; updating, at the base station 110, the first zone model based on the received weights; and transmitting, from the base station 110, the updated first zone model to each UE 120 in the first group. For illustrative purposes, FIG. 1 only shows the FL component 198 of one base station 110a. The FL component 198 may be a component of each base station 110 in FIG. 1. Additionally, the FL component 198 is not limited to base stations 110, other network devices, such as an FL server (not shown in FIG. 1) or a network controller 130, may include an FL component 198.

As indicated above, FIG. 1 is provided merely as an example. Other examples may differ from what is described with regard to FIG. 1.

Figure 2:
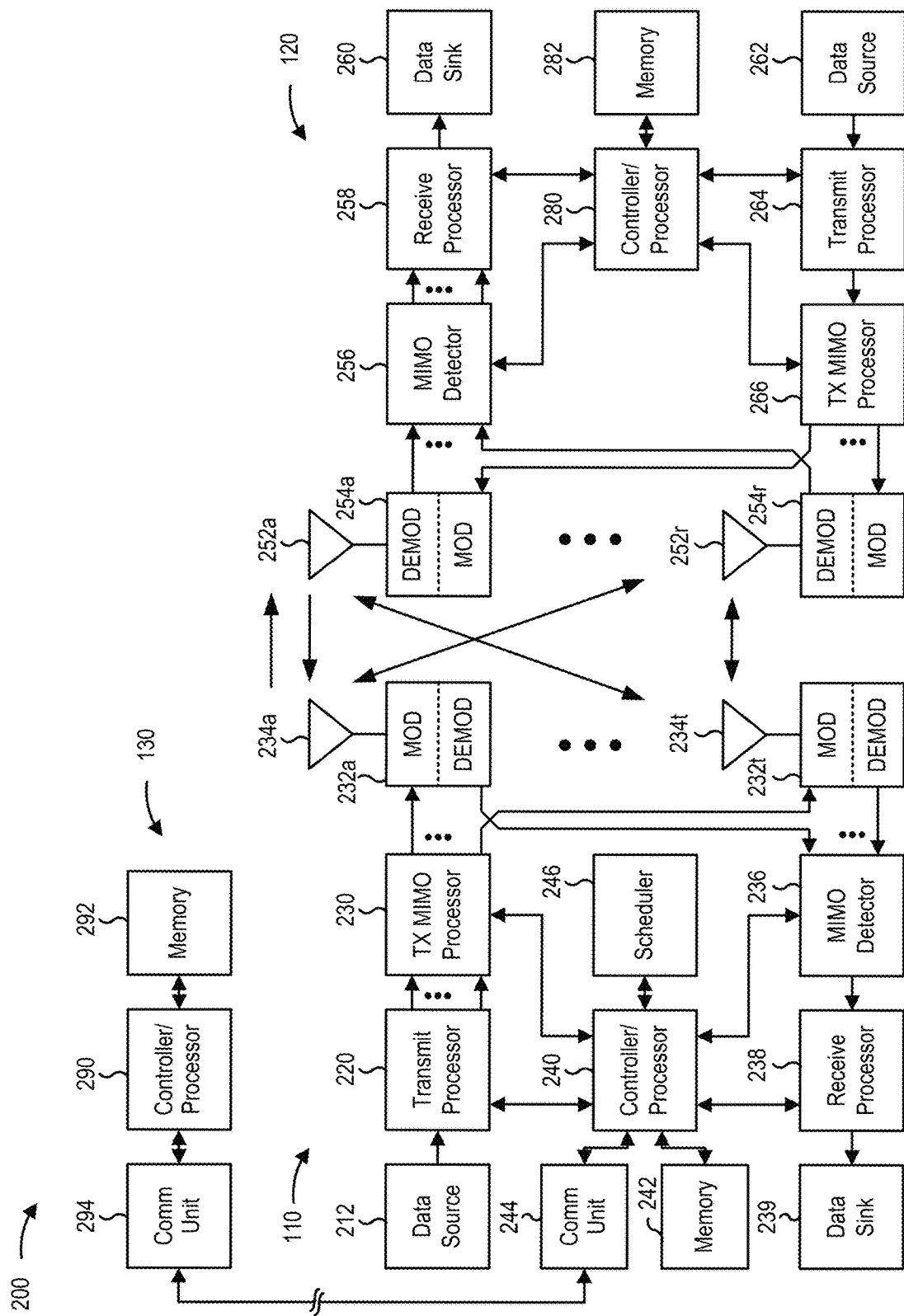
FIG. 2 is a block diagram conceptually illustrating an example of a base station in communication with a user equipment (UE) in a wireless communication network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with zone-based federated learning, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, at the first UE associated with a first group of UEs, a first model from a first network device associated with the first zone model of a number of zone models. In some examples, the first group of UEs is associated with a first zone model, and a different group of UEs is associated with each of the number of zone models. The UE 120 further includes means for identifying, at the first UE, a network device for training the first model based on one or both of a current connectivity state of the UE or a current resource use of the UE. The UE 120 still further includes means for transmitting, to the first network device, model weight updates based on the training of the first model. The UE 120 also includes means for receiving, from the first network device, the first zone model based on the transmitted model weights updates. Such means may include one or more components of the UE 120 described in connection with FIG. 2.

In some aspects, the base station 110 may include means for receiving, at the first network device associated with a first zone model of a number of zone models, a global model from a second network device associated with the global model. The base station 110 further includes means for transmitting, from the first network device, the global model to UEs in a first group of UEs associated with the first zone model. In some examples, a different group of UEs may associated with each of the number of zone models. The base station 110 still further includes means for receiving, at the first network device, weights associated with the global model from each UE in the first group. The base station 110 also includes means for updating, at the first network device, the first zone model based on the received weights. The base station 110 further includes means for transmitting, from the first network device, the updated first zone model to each UE in the first group. Such means may include one or more components of the base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
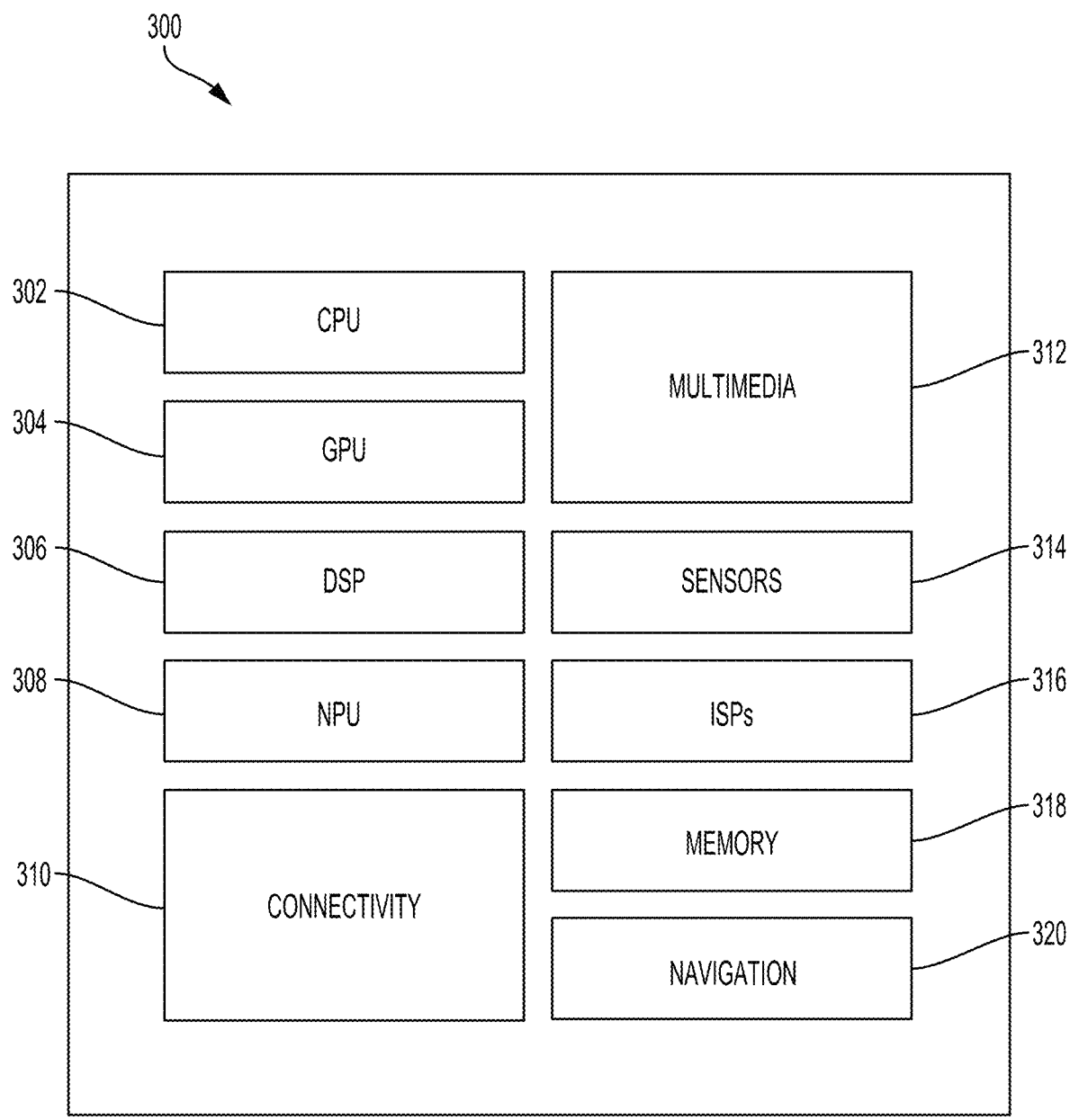
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for zone-based federated learning, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive, at the first network device associated with a first zone model of a number of zone models, a global model from a second network device associated with the global model. The general-purpose processor 302 further includes program code to transmit, from the first network device, the global model to UEs in a first group of UEs associated with the first zone model, a different group of UEs associated with each of the number of zone models. The general-purpose processor 302 still further includes program code to receive, at the first network device, weights associated with the global model from each UE in the first group. The general-purpose processor 302 also includes program code to update, at the first network device, the first zone model based on the received weights. The general-purpose processor 302 further includes program code to transmit, from the first network device, the updated first zone model to each UE in the first group.

In some aspects of the present disclosure, the instructions loaded into the general-purpose processor 302 may comprise code to receive, at the first UE associated with a first group of UEs, a first model from a first network device associated with the first zone model of a number of zone models. In some examples, the first group of UEs is associated with a first zone model, and a different group of UEs are associated with each of the number of zone models. The general-purpose processor 302 further includes program code to identify, at the first UE, a network device for training the first model based on one or both of a current connectivity state of the UE or a current resource use of the UE. The general-purpose processor 302 still further includes program code to transmit, to the first network device, model weight updates based on the training of the first model. The general-purpose processor 302 also includes program code to receive, from the first network device, the first zone model based on the transmitted model weights updates.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
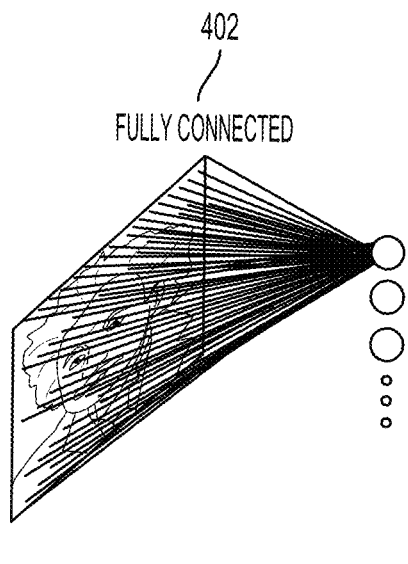
FIGS. 4A, 4B, and 4C are diagrams illustrating a neural network, in accordance with aspects of the present disclosure.
Figure 4B:
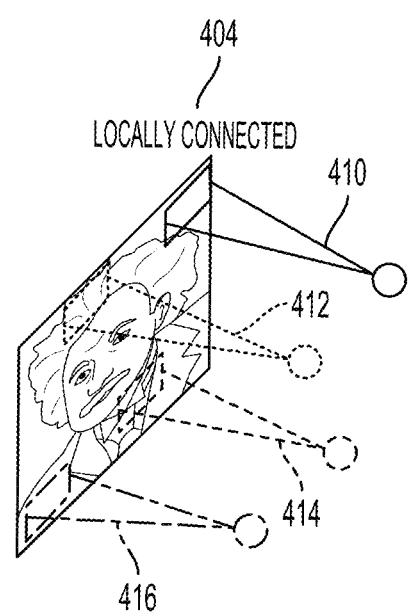

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
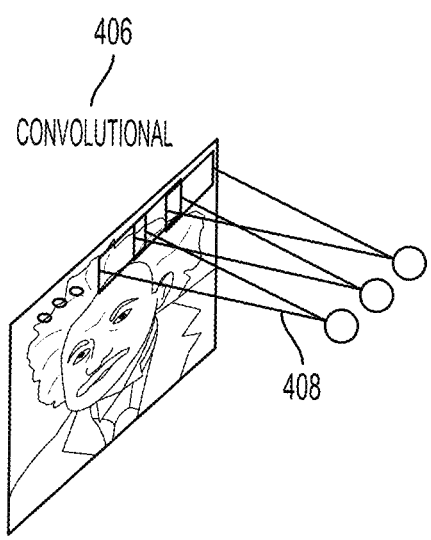

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
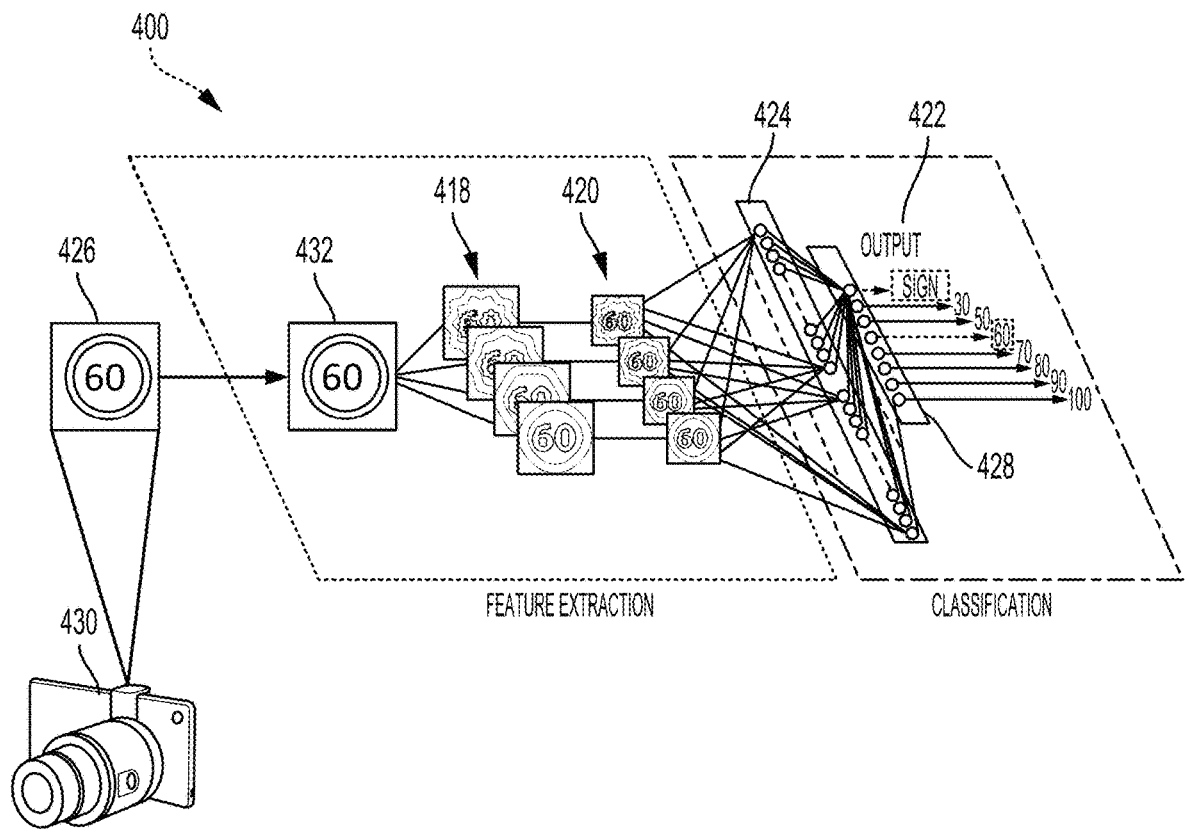
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
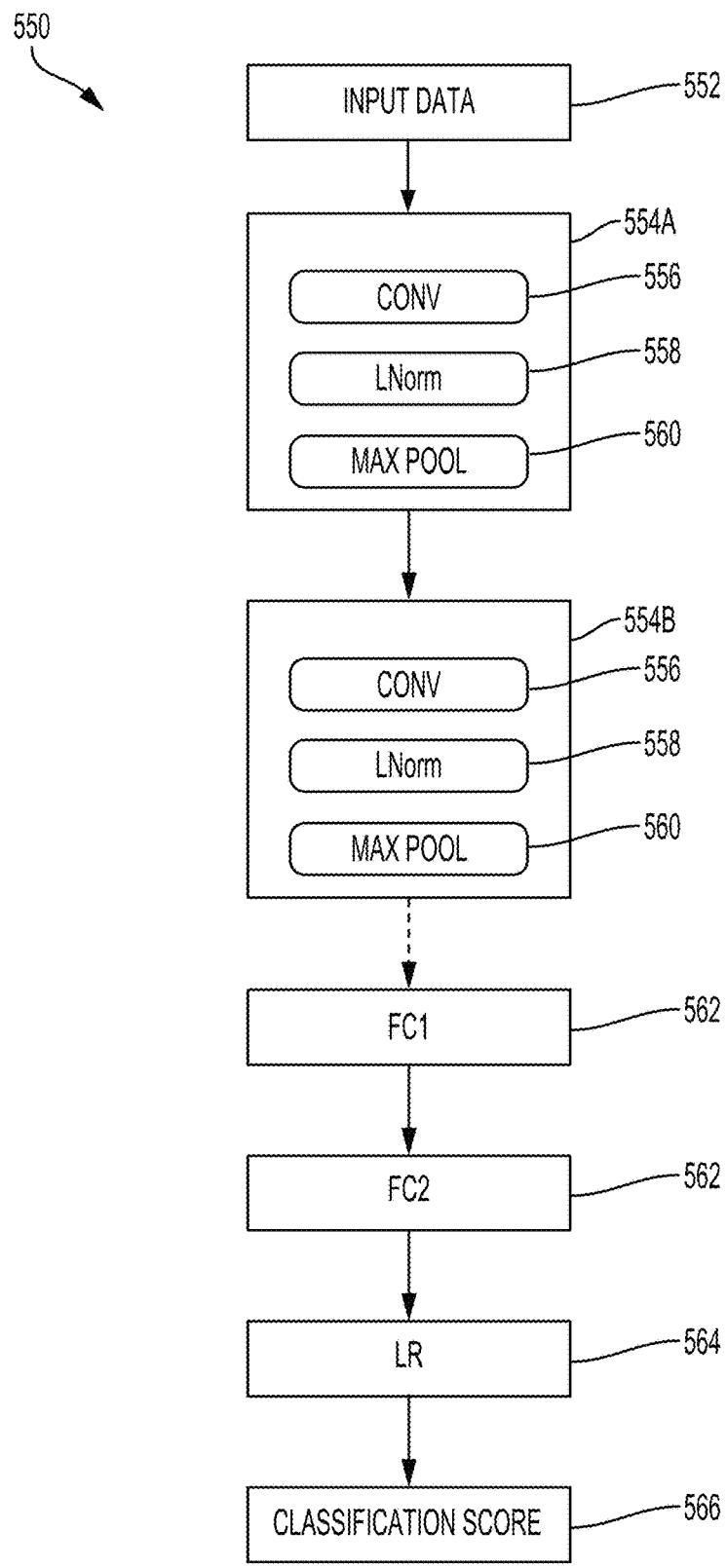
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described, aspects of the present disclosure are directed to grouping participating devices based on shared attributes. For example, participating devices may be grouped based on geographic location. Each group of participating devices may be associated with a machine learning model of a zone. In such an example, participating devices in Los Angeles may be grouped together and associated with a first zone and participating devices in New York may be grouped together and associated with a second zone. The machine learning model of a zone may be referred to as a zone model. By grouping participating devices based on inherent similarities or differences, aspects of the present disclosure may improve machine learning models by providing customized machine learning models that are relevant to a given group (e.g., zone).

Figure 6:
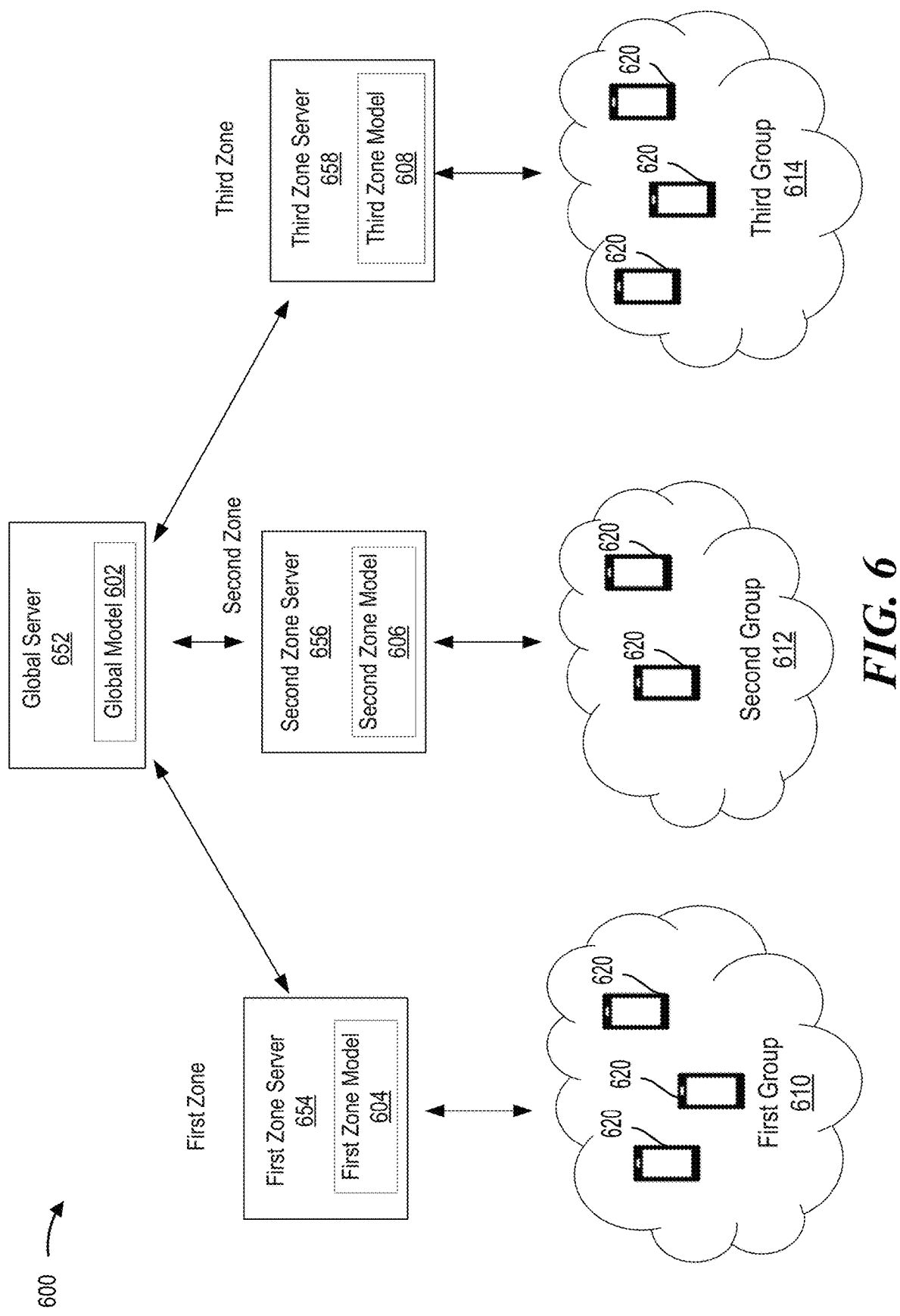
FIG. 6 is a diagram illustrating an example of different zones in a federated learning system, in accordance with aspects of the present disclosure.

FIG. 6 is a diagram illustrating an example 600 of different zones in a federated learning system, in accordance with aspects of the present disclosure. In the example 600 of FIG. 6, each UE 620 may be an example of a device participating in federated learning. Such devices may be referred to as participating devices. Additionally, each UE 620 may be an example of a UE 120 as described with reference to FIGS. 1 and 2. In some implementations, as shown in the example 600 of FIG. 6, each UE 620 may be placed in a group 610, 612, 614 based on one or more common attributes or settings. Each group 610, 612, 614 may correspond to a particular zone. For example, as shown in FIG. 6, a first group 610 corresponds to a first zone, a second group 612 corresponds to a second zone, and a third group 614 corresponds to a third zone. In some examples, a UE 620 may be placed in more than one group 610, 612, 614 (not shown in FIG. 6). Additionally, or alternatively, two or more zones may overlap (not shown in FIG. 6). As described, the attributes and settings may include, but are not limited to, a geographic location, a default language, or a user interface theme. As an example, each group 610, 612, 614 may be based on a UE's geographic location. In this example, the UEs 620 in a first group 610 have a common geographic location, the UEs 620 in a second group 612 have a common geographic location, and the UEs 620 in a third group 614 have a common geographic location. Additionally, as shown in FIG. 6, each group 610, 612, 614 may be associated with a different zone server 654, 656, 658, where each zone server 654, 656, 658 stores a different zone model 604, 606, 608. A zone server may also be referred to as a zone device. The zone models 604, 606, 606 may be examples of machine learning models, such as deep neural networks. Each zone server 654, 656, 658 may be a different network device, such as a federated learning (FL) server. In some examples, each zone server 654, 656, 658 may be integrated with a base station, such as a base station 110 of FIGS. 1 and 2, or a backend server device. As described, each zone model 604, 606, 608 may be customized based on training performed at the participating devices of a corresponding group 610, 612, 614. Furthermore, as shown in FIG. 6, each zone model 604, 606, 608 may be associated with a global model 602 stored in a global server 652, such as a network device (e.g., server). The global server 652 may be in a same location as one or more of the zone server 654, 656, 658. Alternatively, each device 652, 654, 656, 658 may be in a different geographic location. As described, each zone model 604, 606, 608 may be customized based on training performed at UEs 620 of an associated group.

Figure 7:
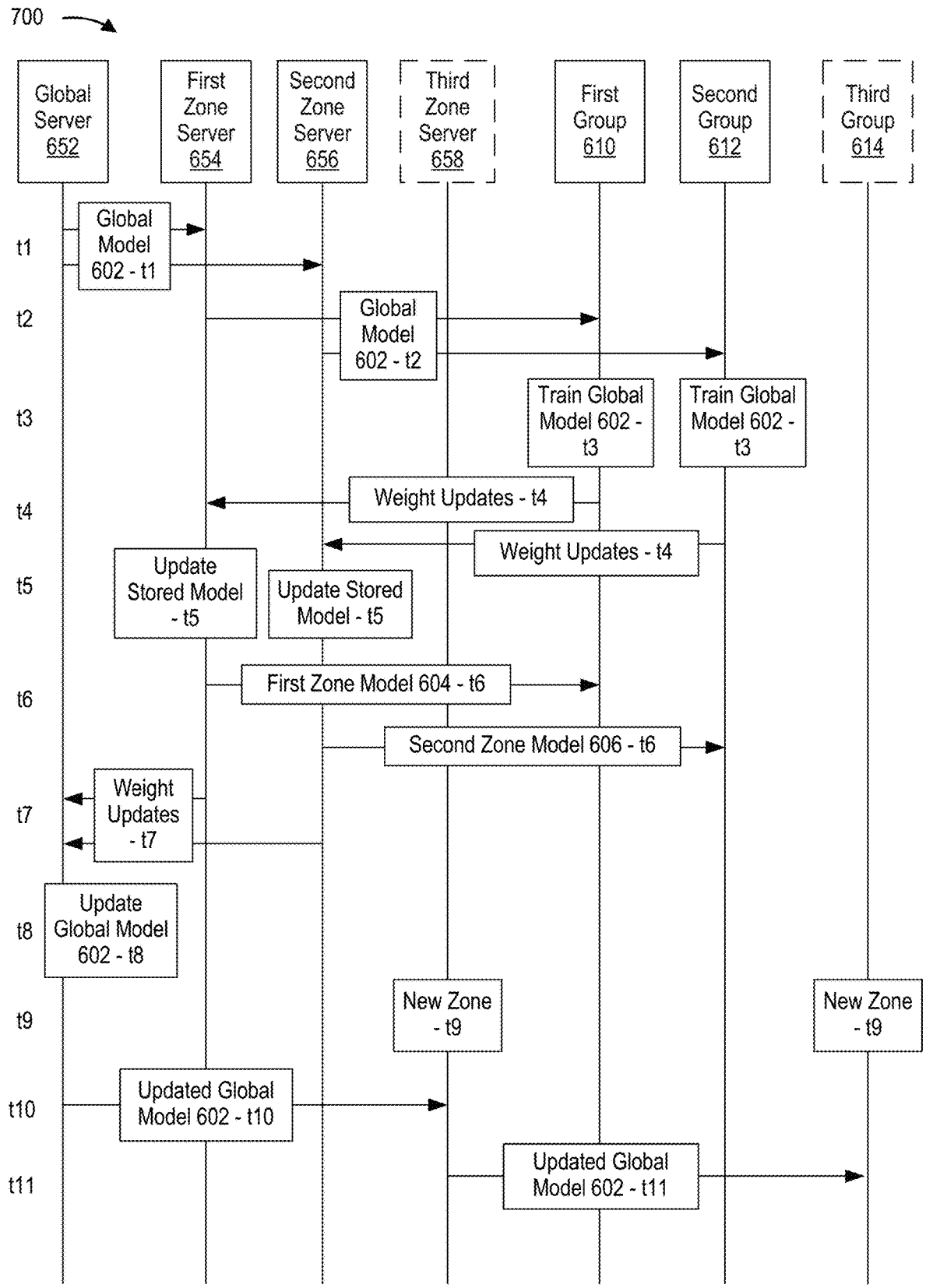
FIG. 7 is a timing diagram illustrating an example of customizing zone models, in accordance with aspects of the present disclosure.

FIG. 7 is a timing diagram illustrating an example 700 of customizing zone models 604, 606, 608, in accordance with aspects of the present disclosure. In the example of FIG. 7, prior to training, UEs 620 (not shown in FIG. 7) are grouped in either a first group 610 associated with a first zone model 604 or a second group 612 associated with a second zone model 606. The UEs 620 may be grouped based on one or more common attributes. As shown in FIG. 7, at time t1, the global server 652 transmits the global model 602 to the first zone server 654 and the second zone server 656. The global model 602 may be stored at each zone server 654, 656. In the current example, the global model 602 transmitted at time t1 may be an untrained global model 602 (e.g., a bare global model 602). Additionally, at time t2, the first zone server 654 and the second zone server 656 transmit the global model 602 to the UEs 620 in the first group 610 and the second group 612, respectively.

After receiving the global model 602, at time t3, each UE 620 in the first group 610 and the second group 612 individually trains the global model 602 based on local data. At time t4, the respective UEs 620 in the first group 610 and the second group 612 transmit weight updates to the first zone server 654 and the second zone server 656, respectively. Each weight update may be based on the training of the global model performed at the respective UEs 620. In some implementations, the weight update may be a difference between an original weight of a global model (e.g., a weight prior to training) and a weight that is updated based on the training. The weight update may include one or more updated weights or weight deltas. That is, in some examples, the weight update does not transmit all weights of a model. At time t5, the first zone server 654 and the second zone server 656 may update the stored model (e.g., the global mode 602 received at time t1) based on the weight updates received from the respective UEs 620 of the associated groups 610, 612. In the example of FIG. 7, respective zone models 604, 606 may be generated based the update to the stored model, such as the global model 602. For ease of explanation, the process at time t5 refers to updating the stored model. In some examples, at an initial training period, the global model 602 and the zone models 604, 606 are the same. However, after the first training round each zone server 654, 656 may update a stored model based on weight updates reported by associated UEs. Updating the stored model creates the zone model 604, 606 for subsequent training rounds.

In some implementations, the received weight updates may be aggregated before updating the global model 602.

For example, the weight updates may be averaged and the stored global model 602 may be updated based on the averaged weight update. In some examples, each update may customize the global model 602 for UEs 620 associated with a specific zone. As an example, the global model 602 stored at the first zone server 654 may be customized to UEs 620 of the first group 610, such that the updated global model 602 may be referred to as a first zone model 604. As another example, the global model 602 stored at the second zone server 656 may be customized to UEs 620 of the second group 612, such that the updated global model 602 may be referred to as a second zone model 606.

Additionally, in some implementations, at time t6, each zone server 654, 656 transmits the respective zone model 604, 606 to UEs 620 of each associated group 610, 612. Each UE 620 may use the respective zone model 604, 606 to perform one or more tasks for an application, such as vocabulary prediction, based on locally collected data. Additionally, each UE 620 may continue to train the respective zone model 604, 606 with locally collected data. That is, each UE 620 may train the respective zone model 604, 606 while also using the respective zone model 604, 606 for a corresponding task, such as inference or prediction. Furthermore, as shown in FIG. 7, at time t7, each zone server 654, 656 transmits the respective weight updates to the global server 652. The weight updates transmitted at time t7 may be raw weight updates or aggregated weight updates, such as an averaged weight updates. Raw weight updates may be an example of weight updates received at a respective zone server 654, 656 prior to aggregation by the respective zone server 654, 656. At time t8, the global server 652 may update the global model 602 based on the received weight updates. In some implementations, the global server 652 may average the received weight updates and update the global model 602 based on the average of the received weight updates. In such implementations, the global server 652 may generate a global averaged model based on the update to the global model 602. In some examples, the global averaged model may be periodically transmitted to the zone level devices 654, 656. In such examples, the global averaged model may improve performance of a certain zone if a performance of the certain zone is less than a performance of other zones. In some examples, the performance may be based on classification accuracy, classification speed, and/or other performance metrics. The global averaged model may refresh a zone model of the certain zone to improve performance. Additionally, or alternatively, the global averaged model may initiate a new zone. In some implementations, the process described from times t1 to t8 may repeat for each UE 620 until training termination. The training termination may be caused by a UE 620 leaving a group 610, 612, a UE 620 removing an application associated with a model 604, 606, or other factors.

As an example, as shown in FIG. 7, at time t9, a third zone server 658 and third group 614 may be added as a new zone (e.g., a third zone). In this example, a third zone model associated with the third zone server 658 and third group 614 may not have a same number of training iterations in comparison to zone models of other zones, such as a first zone and a second zone, because UEs 620 associated with the third group 614 have yet to train the third zone model. Thus, at time t10, to improve overall performance and reduce training time, the global server 652 may transmit the updated global model 602 to the third zone server 658, such that the third zone model associated with the third zone server 658 may be initiated based on training performed by UEs 620 associated with other groups 610, 612. In other implementations, rather than transmitting the updated global model 602, the updated global model 602 may transmit weights from another zone, such as the first zone. In such implementations, the weights from a pre-existing zone may be transmitted to the new zone, such as the third zone associated with the third zone server 658, based on the new zone and the pre-existing zone having one or more common attributes. For example, UEs 620 associated with groups of the pre-existing zone and the new zone may share a same default language or the UEs 620 may be in a similar geographic region, such as Western United States. As shown in FIG. 7, at time t11, the third zone server 658 transmits the updated global model 602 to each UE 620 in the third group 614. The UEs 620 in the third group 614 may train the model 602 as described above with reference to time t3. The process for the UEs 620 of the third group 614, the third zone server 658, and the global server 652 may continue as described above with reference to times t4-t8. Additionally, as described, the process described from times t1 to t8 may repeat for each UE 620 in the third group 614 until training is terminated. In some examples, training may be terminated when a desired accuracy is achieved. In the example of FIG. 7, the training may be performed on a subset of participating devices in each zone. In some examples, the training may be performed in parallel at each participating device in the zone. Additionally, the averaging of the weights may be performed when all weights have been collected at a zone server from the different respective participating devices. Further averaging/aggregation can be performed at the global level where the zone based devices act as participants.

In some implementations, a participating device, such as a UE, may be excluded from federated learning training for a duration of time in response to the participating device migrating between zones. As an example, a UE may move from a first zone to a second zone. In such an example, based on the UE moving from the first zone to the second zone, the UE may be excluded from training a second zone model associated with the second zone for a period of time.

In some implementations, a new zone, such as a migration zone, may be generated for participating devices moving between a set of zones. The new zone may be customized based on habits of the participating device moving between the set of zones. As an example, a set of participating devices may move between a zone associated with a suburb to a zone associated with a city center. In such an example, habits and preferences of participating devices may differ based on whether a participating device stays in the suburb, stays in the city center, or moves between the suburb and the city center. Thus, a new zone, such as a migration zone, may cater to the habits and preferences of the set of participating devices that move between the zone associated with the suburb and the zone associated with the city center.

Aspects of the present disclosure are not limited to training one federated learning model, such as a zone model, at a participating device. In some implementations, a participating device may participate in training multiple federated learning models. In such implementations, the participating devices may include a federated learning manager to manage device resources such that device resources may be used in an optimal manner. The federated learning manager may be middleware stored and executed on each participating device.

Figure 8:
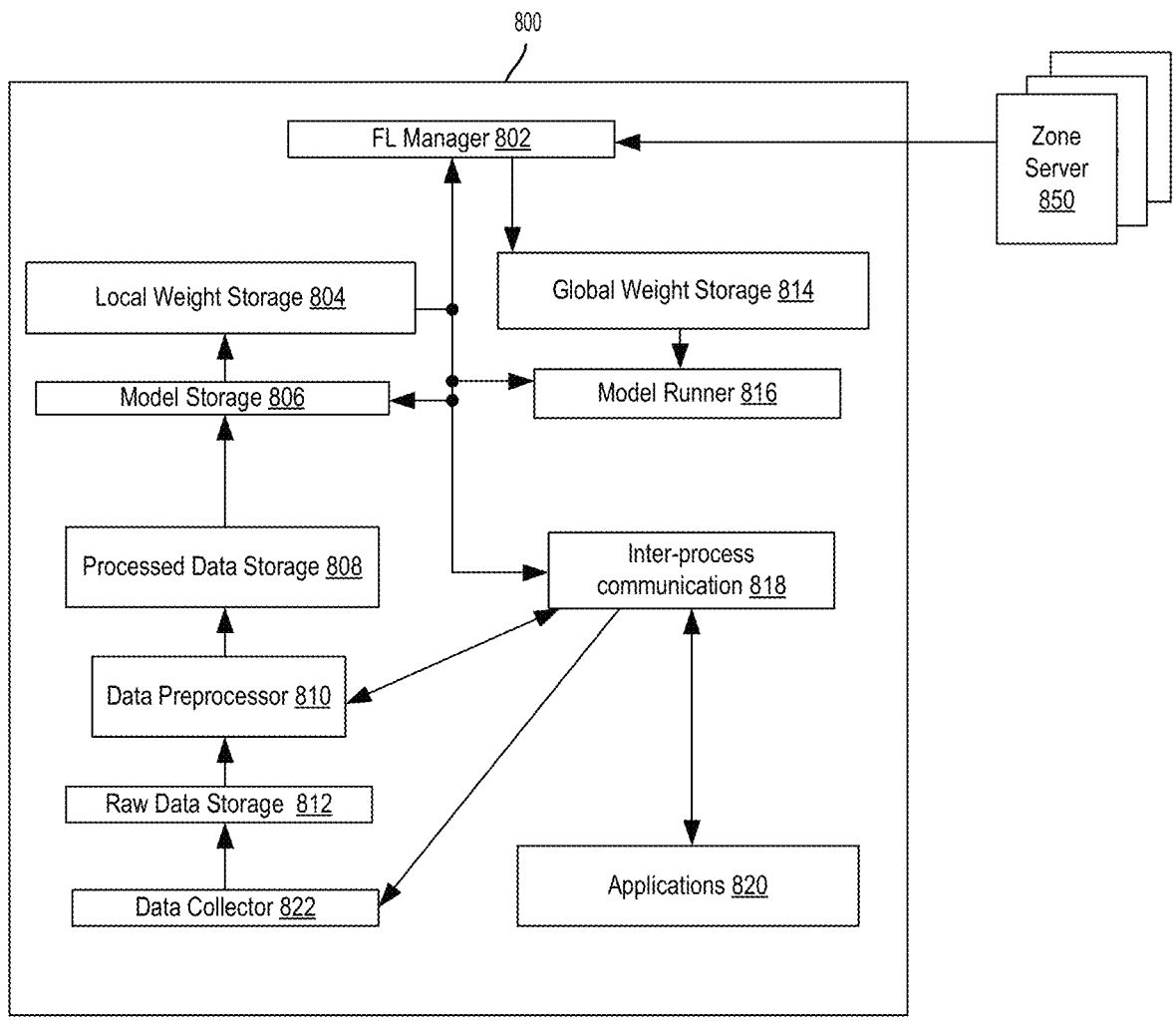
FIG. 8 is a block diagram illustrating an example of a participating device including a federated learning (FL) manager, in accordance with aspects of the present disclosure.

FIG. 8 is a block diagram illustrating an example of a participating device 800 including a federated learning (FL) manager 802, in accordance with aspects of the present disclosure. In the example of FIG. 8, the participating device 800 may be an example of a UE, such as a UE 120 or 620 as described with reference to FIGS. 1, 2, 6, and 7, respectively. Additionally, zone servers 850 may be examples of the zone servers 654, 656, 658 as described with reference to FIGS. 6 and 7. As shown in FIG. 8, the participating device 800 may include multiple components, such as a local weight storage 804, a global weight storage 814, a model storage 806, a model runner 816, a processed data storage 808, a data preprocessor 810, a raw data storage 812, an inter-process communication component 818, and a data collector 822. The various storage components 804, 806, 808, 812, 814 may be different partitions or storage locations in a same storage device, such as the memory 282 as described with reference to FIG. 2. In another example, the storage components 804, 806, 808, 812, 814 may be different storage devices. An inter-process communication component 818, such as a bus or a controller/processor, may facilitate communication between the different components 804, 806, 808, 810, 812, 814, 816. The inter-process communication component 818 may be an example of the controller/processor 280 as described with reference to FIG. 2. Additionally, as shown in FIG. 8, the participating device may include applications 820. The applications 820 may be stored in a storage component 804, 806, 808, 812, 814, or another storage location (not shown in FIG. 8). In some examples, the applications 820 may use an interface of the participating device 800.

In some examples, an FL manager 802 controls data collection using one or more data collectors 822. Each data collector 822 may collect data from a sensor (not shown in FIG. 8) at a sampling rate. In some implementations, a data collector 822 may be embedded with another data collector 822, such that both data collectors 822 simultaneously collect different types of data. Controlling the data collection via the FL manager 802 may improve resource use, such as battery use and/or processor use, because the FL manager 802 may prevent multiple data collectors 822 from collecting the same data. Additionally, sensor access control may be simplified based on the FL manager 802 controlling the data collection. In some examples, the FL manager 802 may dynamically (e.g., on-demand) configure one or more of sensor types, sampling rates, and a period for flushing data from memory (not shown in FIG. 8) to storage, such as processed data storage 808. Each model may inform the FL manager 802 of the type of data it needs for training and a specified sampling rate. Based on the information provided by each model, the FL manager 802 may identify the appropriate data collectors 822 to invoke and a corresponding sampling rate. In some implementations, the FL manager 802 may use one or more policies to balance sensing accuracy (e.g., a sampling rate) with resource consumption (e.g., battery use, process load, etc.).

In the example of FIG. 8, the data collectors 822 store data obtained from one or more sensors (not shown in FIG. 8) in the raw data storage 812. Additionally, the data collectors 822 may inform the FL manager 802 when new data is added to the raw data storage 812. In some examples, the data collectors 822 may buffer a certain amount of sensed data in memory before committing the sensed data to the raw data storage 812. The FL manager 802 may dynamically reconfigure the data flushing period that defines when the data is written to the raw data storage 812. In such examples, the data flushing period may be initial set by the data collectors 822.

In some examples, a model may use the raw data. In other examples, a model may specify additional processing for the raw data. The additional processing may be performed by a data processor 810. Although not shown in FIG. 8, the phone 800 may include one or more data processors 810. Additionally, one or more data processors 810 may be model-specific. In some examples, the FL manager 802 may determine when to invoke the model-specific data processors 810. Each data processor 810 may store data in the processed data storage 808. The data may be stored at an interval or based on new data being available in the raw data storage 812. In some examples, all data is pre-processed before initiating a new local model training operation.

In some examples, the data processor 810 and data collectors 822 may be implemented by third-party developers. In some such examples, the FL manager 802 may use an inter-process communication (IPC) 818 function provided by the phone's 800 operating system to interact with third-party components.

As described, the FL manager 802 may initiate a model trainer for a given model and determines a location of the data in the processed data storage 808 or raw data storage 812. After the training is completed, the model trainer may store the newly computed weights in the local weight storage 804. Additionally, the FL manager 802 may determine when the stored weights may be uploaded to a network device.

In some examples, the FL manager 802 may receive multiple models from one or more zone servers 850. That is, multiple models (e.g., federated learning models or applications) may be provided to the participating device 800. As an example, a first application may be a text prediction model and a second application may be a location based advertising model. In such examples, the FL manager 802 may determine a training time for each model. In some examples, the participating device 800 may be associated with two different zone servers, where each zone server is associated with a different zone. Each zone server may transmit a different model. As another example, a single zone server may transmit two or more different zone models.

The models may be stored in the model storage 806. Local weights of each model may be stored in local weight storage 804 and global weights may be stored in the global weight storage 814. In some implementations, the FL manager 802 may work in conjunction with one or more components 804, 806, 808, 810, 812, 814, 816 of the participating device 800 to determine a training priority of the various models stored in the model storage 806. In some examples, a priority of the model may be determined based on various criteria, such as, but not limited to, one or more of a number of samples available for training for a given model, a current accuracy of the model, an estimated model training time determined based on previous training times, and whether the training can be successfully completed based on current resources availability (e.g., battery levels, current system load, etc.). Additionally, the FL manager 802 may manage a local training state of the various models stored in the model storage 806. As an example, the FL manager 802 may stop training a first model and start training a second model. In such an example, the FL manager 802 may store the local weights of the first model in the local weight storage 804 to maintain the training state of the first model, such that the training may resume at a later time.

In some implementations, the FL manager 802 may determine current device resources to assess whether one or more models may be locally trained (e.g., trained on-device). It may be desirable to locally train the model to preserve data privacy. Still, local training may be limited because the participating device 800, such as UEs and edge-devices, may have a limited amount of resources. In such implementations, the FL manager 802 may use a training proxy if the current device resources satisfy a resource condition and a current connectivity state satisfies a connection condition.

As described, an amount of available resources, such as available memory or processer load, may prevent the participating device 800 from locally training a model. In this example, the resource condition may be satisfied when an amount of available resources prevents local training. That is, the amount of available resources may be less than a threshold. In some examples, the FL manager 802 may determine the current connectivity state when the resource condition is satisfied. The connectivity state refers to a connection status between the participating device 800 and a network device over a communication channel, such as Wi-Fi channel or a cellular channel. In such an example, the connection condition may be satisfied if the participating device can communicate with a network device, such as an inter-network or intra-network device, over a communication channel. In this example, the FL manager 802 may use the network device as a proxy for training the model.

In some implementations, a training proxy may be individually controlled by each participating device to improve training speed while still preserving privacy. The training proxy may be a network device that may receive both a model and training data. The network device may train the model and return the trained weights and biases to the participating device. In some examples, the training proxy may delete data corresponding to the model, weights, and biases after the training session. Furthermore, in some examples, the training proxy may not understand an overall context of the model. Rather, the training proxy may only be responsible for training the model. Additionally, a global server may be unaware of the training proxy. Because of the decentralized nature of training, and because the training proxy is unaware of the overall context, the privacy of the participating device may be preserved.

Figure 9:
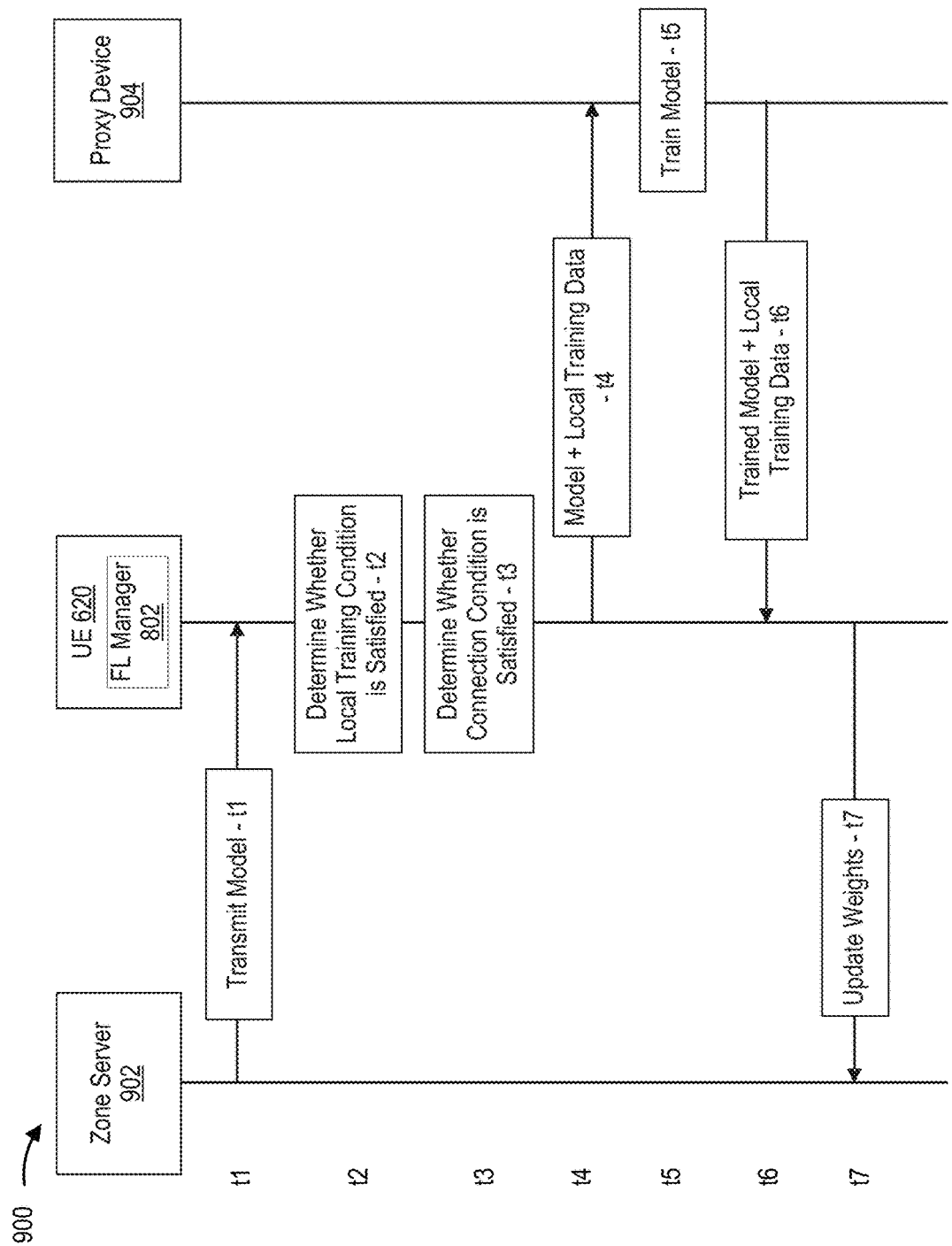
FIG. 9 is a timing diagram illustrating an example of federated learning with a training proxy, in accordance with aspects of the present disclosure.

FIG. 9 is a timing diagram illustrating an example 900 of federated learning with a training proxy, in accordance with aspects of the present disclosure. The example 900 includes a zone server 902, a UE 620, and a proxy device 904. The zone server 902 may be an example of a zone server 654, 656, 658 as described with reference to FIGS. 6 and 7. The UE 620 may be an example of a UE 120 as described with reference to FIGS. 1 and 2. The UE 620 may include a federated learning (FL) manager 802 as described with reference to FIG. 8. The proxy device 904 may be a wired or wireless network device that shares a network with the UE 620. In such an example, the proxy device 904 may be an intra-net device. Alternatively, the proxy device 904 may be a cloud device, such that the proxy device 904 and the UE 620 are geographically separated.

As shown in FIG. 9, at time t1, the zone server 902 transmits a model to a UE 620. The model may be a bare global model, a global averaged model, or a zone model. Additionally, the model may be one of multiple models stored at the UE 620 for federated learning. At time t2, based on receiving the model, the FL manager 802 may determine whether a local training condition is satisfied. As described, the local training condition may be satisfied if the available resources at the UE 620 support local training. That is, the UE 620 may be capable of local training if an amount of available resources is greater than a threshold. Alternatively, the UE 620 may not be capable of local training if an amount of available resources is less than a threshold. For exemplary purposes, the example of FIG. 9 assumes the UE 620 is not capable of locally training the received model.

Based on determining the local training condition is not satisfied, at time t3, the FL manager 802 determines if a connection condition is satisfied. As described, the connection condition may be satisfied if the UE 620 may communicate with the proxy device 904 via a communication channel, such as a cellular channel, Wi-Fi channel, or other type of communication channel. In the example of FIG. 9, it is assumed the communication condition is satisfied. Based on determining the communication condition is satisfied, at time t4, the UE 620 may transmit the model and local training data to the proxy device 904. In some implementations, the model and the local training data may be transmitted via a secure connection. At time t5, the proxy device 904 may generate a secure container for training the model based on the local training data. After training the model, the proxy device may transmit the model weights and the local training data to the UE 620 (time t6). In some examples, the proxy device may also transmit meta data for the UE to identify the model that was trained. After training the model, the proxy device 904 may delete stored data, such as the model and/or training, associated with the training. The data may be stored to improve data privacy. At time t7, the UE 620 may transmit updated weights corresponding to the trained model to the zone server 902. In the example of FIG. 9, the zone server 902 may be unaware of the use of the proxy device 904 for training the model. Additionally, the proxy device 904 may be unaware of a global context of the model. Therefore, the privacy of local data collected by the UE 620 for training may be preserved.

Figure 10:
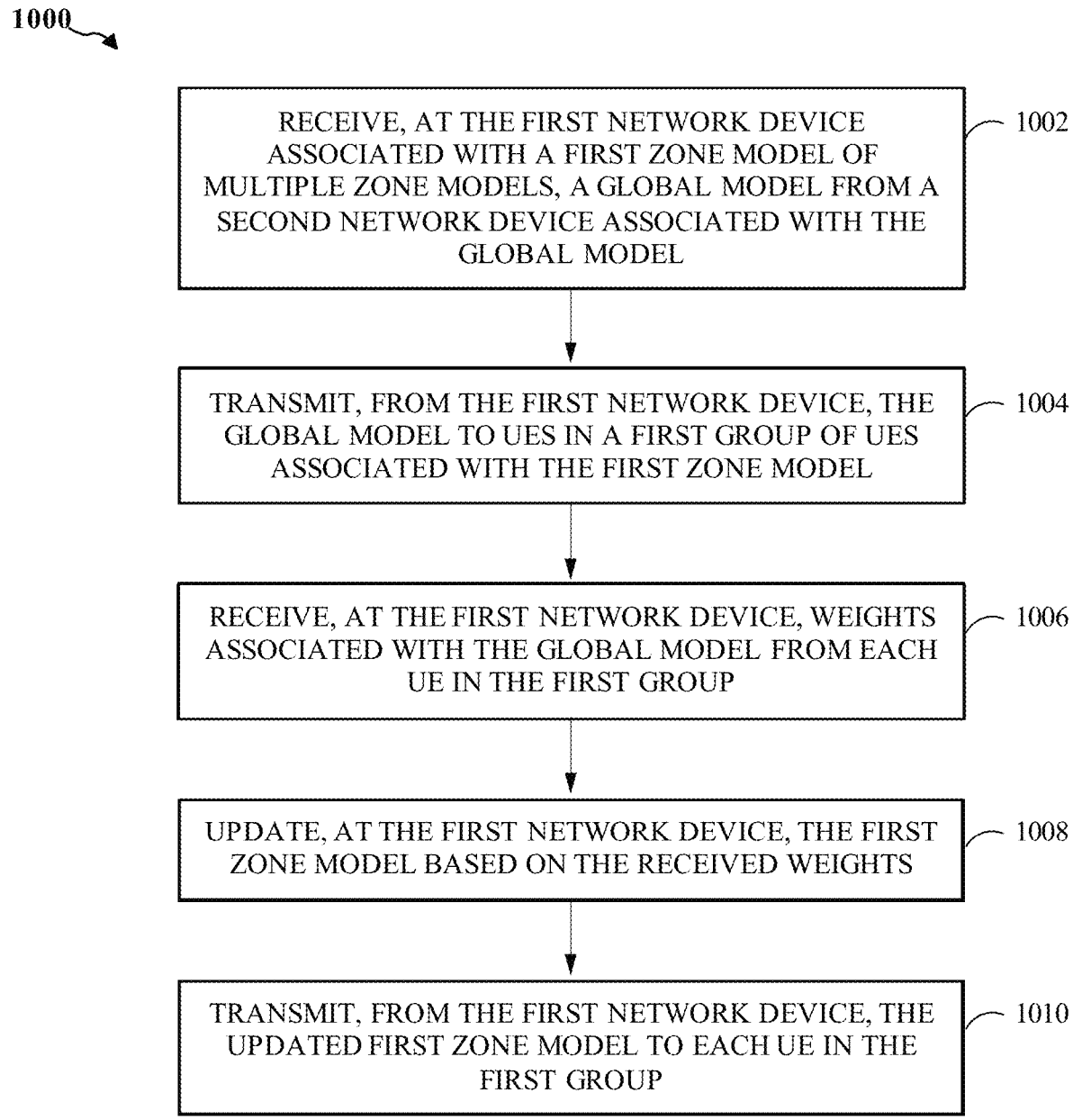
FIG. 10 is a flow diagram illustrating an example process performed, for example, by a network device, in accordance with various aspects of the present disclosure.

FIG. 10 is a flow diagram illustrating an example process 100 for managing model updates by a first network device, in accordance with aspects of the present disclosure is a diagram illustrating an example process 1000 performed, for example, by a network device, in accordance with various aspects of the present disclosure. In some implementations, the process 1000 may be performed by a wireless communication device operating as or within a network device, such as one of the base stations 110 described above with respect to FIGS. 1 and 2, or a zone server, such as one of the zone servers 654, 656, 658, 902 described above with respect to FIGS. 6, 7, and 9, respectively.

As shown in FIG. 10, at block 1002, the process 1000 receives, at the first network device associated with a first zone model of a number of zone models, a global model from a second network device associated with the global model. Each zone model may be associated with a different zone. As an example, the first zone model may be associated with a first zone. The first network device may be an example of a zone server and the second network device may be an example of a global server. The global model may be an example of the global model 602 described with reference to FIGS. 6, 7, and 9. At block 1004, the process 1000 transmits, from the first network device, the global model to UEs in a first group of UEs associated with a first zone. In some examples, a different group of UEs is associated with each of the number of zone models. As an example, UEs may be grouped based on one or more attributes. At block 1006, the process 1000 receives, at the first network device, weights associated with the global model from each UE in the first group. In some examples, the weights associated with the global model may be a set of weight deltas for one or more weights of the model. In some such examples, the UE does not transmit the entire weights set. Rather, the UE may transmit a change between an original weight and a trained weight. At block 1008, the process 1000 updates at the first network device, the first zone model based on the received weights. At block 1010, the process 1000 transmits, from the first network device, the updated first zone model to each UE in the first group.

Figure 11:
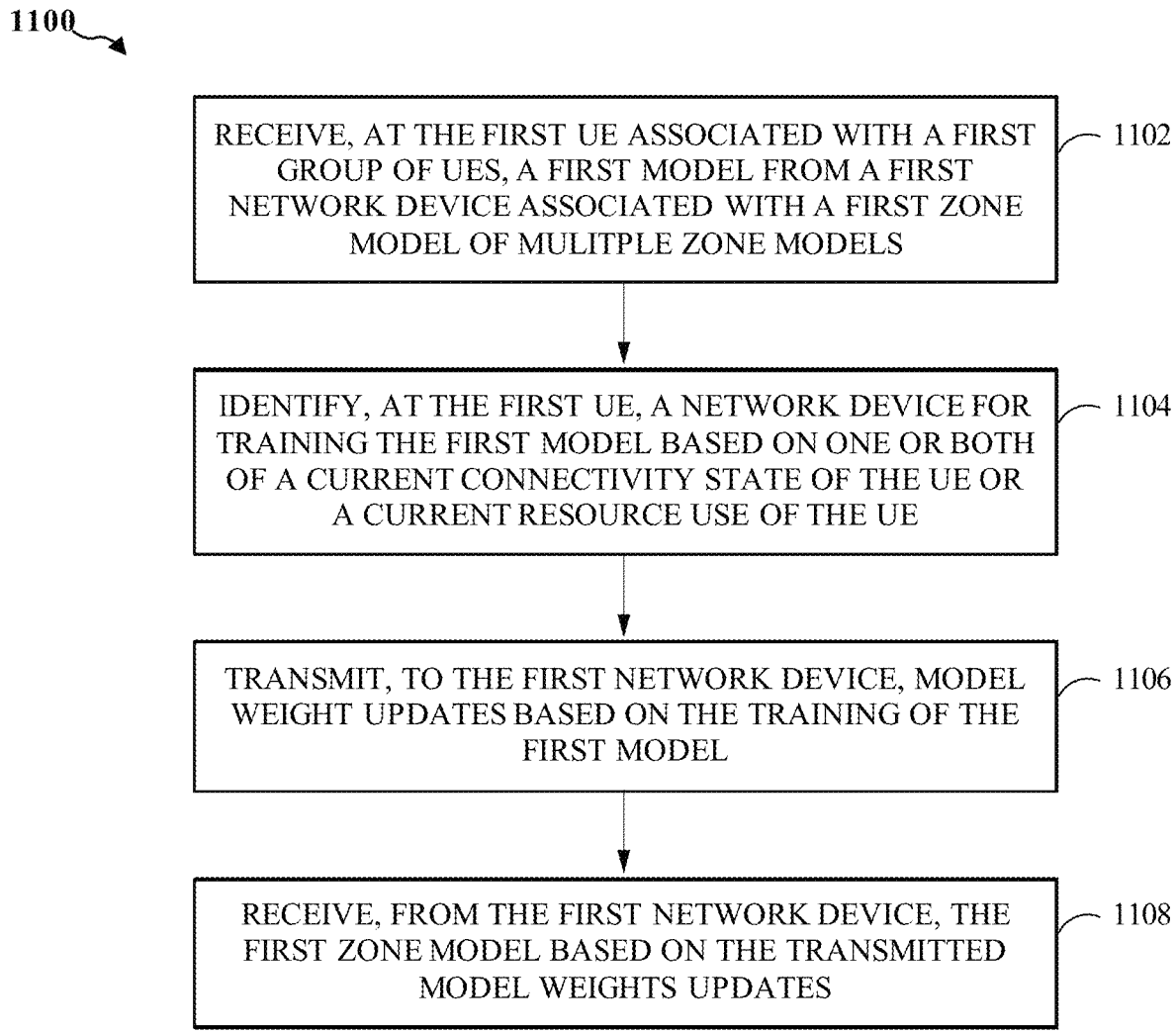
FIG. 11 is a flow diagram illustrating an example process performed, for example, by a UE, in accordance with various aspects of the present disclosure.

FIG. 11 is a flow diagram illustrating an example process 1100 for training models by a UE, in accordance with aspects of the present disclosure is a diagram illustrating an example process 1100 performed, for example, by a network device, in accordance with various aspects of the present disclosure. In some implementations, the process 1100 may be performed by a network device operating as or within a UE, such as one of the UEs 120, 620, 800, described above with respect to FIGS. 1, 2, 6, 7, 8, and 9, respectively.

As shown in FIG. 11, at block 1102, the process 1100 receives, at the first UE associated with a first group of UEs, a first model from a first network device associated with a first zone model of a number of zone models. In some examples, the first model may be an example of a global model. In such examples, the first UE receives the global model prior to an initial training phase. In some examples, the first group of UEs is associated with the first zone model, and a different group of UEs are associated with each of the number of zone models. At block 1104, the process 1100 identifies, at the first UE, a network device for training the first model based on one or both of a current connectivity state of the UE or a current resource use of the UE. In some examples, the network device is the first UE as described with reference to FIGS. 6 and 7. In some other examples, the network device is a proxy as described with reference to FIG. 9. At block 1106, the process 1100 transmits, to the first network device, model weight updates based on the training of the first model. In some examples, the model weight updates may be a set of weight deltas for one or more weights of the model. In some such examples, the UE does not transmit the entire weights set. At block 1108, the process 1100 receives, from the first network device, the first zone model based on the transmitted model weights updates. In some examples, such as the example described with reference to FIG. 7, a zone server updates a global model based on the model weight updates to generate a first zone model.

Implementation examples are described in the following numbered clauses:

1. A method for managing model updates by a first network device, comprising:
   receiving, at the first network device associated with a first zone model of a plurality of zone models, a global model from a second network device associated with the global model;
   transmitting, from the first network device, the global model to user equipment (UEs) in a first group of UEs associated with the first zone model, a different group of UEs associated with each of the plurality of zone models;
   receiving, at the first network device, weights associated with the global model from each UE in the first group;
   updating, at the first network device, the first zone model based on the received weights; and
   transmitting, from the first network device, the updated first zone model to each UE in the first group.
2. The method of Clause 1, in which the global model is an untrained global model.
3. The method of Clause 1, in which the global model comprises weight updates from one or more zone models of the plurality of zone models.
4. The method of Clause 1, in which:
   the global model is a second zone model generated at a third network device associated with the second zone model; and
   one or more attributes of the first zone model and the second zone model satisfy a similarity condition.
5. The method of any of Clauses 1-4, in which UEs in the first group of UEs are grouped based on one or more attributes.
6. The method of Clause 5, in which the one or more attributes comprise one or more of a geographic location, a default language, or a user interface theme.
7. The method of any of Clauses 1-6, further comprising excluding a UE in the first group of UEs for a period of time based on the UE moving to the first group from a second group of UEs.
8. The method of any of Clause 1-7, in which the first group of UEs comprises UEs that change between a first attribute corresponding to a second group of UE and a second attribute corresponding to a third group of UEs.
9. The method of any of Clause 1-8, further comprising:
   averaging the weights received from each UE in the first group; and
   transmitting an average of the weights to the second network device.
10. The method of Clause 9, in which updating the first zone model comprises updating the first zone model based on the average of the weights.
11. The method of Clause 9, further comprising receiving a global averaged model based on transmitting the average of the weights to the second network device.
12. A method performed by a first user equipment (UE), comprising:
   receiving, at the first UE associated with a first group of UEs, a first model from a first network device associated with the first zone model of a plurality of zone models, the first group of UEs associated with a first zone model, and a different group of UEs associated with each of the plurality of zone models;
   identifying, at the first UE, a network device for training the first model based on one or both of a current connectivity state of the UE or a current resource use of the UE;
   transmitting, to the first network device, model weight updates based on the training of the first model; and
   receiving, from the first network device, the first zone model based on the transmitted model weights updates.
13. The method of Clause 12, in which identifying the network device comprises identifying the first UE as the network device based on the current connectivity state of the UE satisfying a connectivity condition and the current resource use satisfying a resource condition, and the method further comprises:
   training the model at the first UE based on local training data collected at the first UE based on identifying the UE as the network device; and
   generating the model weight updates based on the training.
14. The method of any of Clauses 12-13, further comprising maintaining a local training state of the model across training iterations of the model.
15. The method of any of Clauses 12-13, further comprising:
   receiving a set of models at the first UE, the first model being one model of the set of models; and training the model from of the set of models based on a training priority of the model being higher than a training priority associated with each other model of the set of models.

16. The method of Clause 12, in which identifying the network device comprises identifying a proxy device as the network device based on one or both of the current connectivity state of the UE failing to satisfy a connectivity condition or the current resource use failing to satisfy a resource condition, and the method further comprises:
    transmitting the model and training data collected at the first UE to the proxy device for training the model at the proxy device using the training data collected at the first UE; and
    receiving the model weights updates from the proxy device based on the training performed at the proxy device.

17. The method of Clause 16, in which the proxy device and the UE are intra-network devices or inter-network devices.

18. The method of any of Clauses 12-17, in which the model is an untrained model.

19. The method of any of Clauses 12-17, in which the model comprises weight updates from one or more zone models of the plurality of zone models.

20. The method of any of Clauses 12-17, in which:
    the model is a second zone model generated at a third network device associated with the second zone model; and
    one or more attributes of the first zone model and the second zone model satisfy a similarity condition.

21. The method of any of Clause 12-20, in which one or more attributes of the first UE are the same as one or more attributes of each respective UE in the first group of UEs.

22. The method of Clause 21, in which the one or more attributes comprise one or more of a geographic location, a default language, or a user interface theme.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for managing model updates by a first zone server associated with a first zone model of a plurality of zone models, comprising:
    receiving, at the first zone server, a global model from a global server associated with the global model;
    transmitting, from the first zone server, the global model to user equipment (UEs) in a first group of UEs of a plurality of groups of UEs, the first group of UEs associated with the first zone model, each group of UEs of the plurality of groups of UEs associated with a respective zone model of the plurality of zone models, each zone model of the plurality of zone models associated with the global model;
    receiving, at the first zone server from two or more UEs in the first group of UEs, model updates associated with the global model based on transmitting the global model;
    transmitting, from the first zone server to the global server, an average of the model updates received from the two or more UEs;
    updating, at the first zone server, one or more weights of the global model in accordance with the average of the model updates to generate the first zone model based on receiving the model updates; and
    transmitting, from the first zone server, the first zone model to the first group of UEs.

2. The method of claim 1, wherein the global model is an untrained global model.

3. The method of claim 1, wherein:
    the global model is a second zone model generated at a second zone server associated with the second zone model;
    the global server is the second zone server; and
    one or more attributes of the first zone model and the second zone model satisfy a similarity condition.

4. The method of claim 1, wherein UEs in the first group of UEs are grouped based on one or more common attributes.

5. The method of claim 4, wherein the one or more common attributes comprise one or more of a geographic location, a default language, or a user interface theme.

6. The method of claim 1, further comprising excluding a UE in the first group of UEs for a period of time based on the UE moving to the first group of UEs from a second group of UEs.

7. The method of claim 1, wherein the first group of UEs comprises UEs that change between a first attribute corresponding to a second group of UE and a second attribute corresponding to a third group of UEs.

8. The method of claim 1, further comprising receiving, from the global server, a global averaged model based on transmitting the average of the model updates to the global server.

9. The method of claim 1, further comprising generating a model update associated with the global model.

10. A system for managing model updates, the system comprising a first zone server and a global server:
the first zone server comprising:
one or more first processors; and
one or more first memories coupled with the one or more first processors and storing first processor-executable code that, when executed by the one or more first processors, is configured to cause the first zone server to:
receive, at the first zone server associated with a first zone model of a plurality of zone models, a global model from the global server associated with the global model;
transmit, from the first zone server, the global model to user equipment (UEs) in a first group of UEs of a plurality of groups of UEs, the first group of UEs associated with the first zone model, each group of UEs of the plurality of groups of UEs associated with a respective zone model of the plurality of zone models, each zone model of the plurality of zone models associated with the global model;
receive, at the first zone server from two or more UEs in the first group of UEs, first model updates associated with the global model based on transmitting the global model;
transmit, to the global server, an average of the model updates received from the two or more UEs;
update, at the first zone server, one or more weights of the global model in accordance with the average of the model updates to generate the first zone model based on receiving the first model updates; and
transmit, from the first zone server, the first zone model to the first group of UEs.

11. The system of claim 10, wherein the global model is an untrained global model.

12. The system of claim 10, wherein UEs in the first group of UEs are grouped based on one or more of a geographic location, a default language, or a user interface theme.

13. The system of claim 10, wherein the system further comprises a second zone server, the second zone server comprising:
one or more second processors; and
one or more second memories coupled with the one or more second processors and storing second processor-executable code that, when executed by the one or more second processors, is configured to cause the second zone server to:
receive, at the second zone server associated with a second zone model of the plurality of zone models, the global model from the global server;
transmit, from the second zone server, the global model to UEs in a second group of UEs of the plurality of groups of UEs, the second group of UEs associated with the second zone model;
receive, at the second zone server from one or more UEs in the second group of UEs, second model updates associated with the global model based on transmitting the global model the second group of UEs;
update, at the second zone server, one or more weights of the global model in accordance with the second model updates to generate the second zone model based on receiving the second model updates; and
transmit, from the second zone server, the second zone model to the second group of UEs.

14. The system of claim 10, wherein execution of the first processor-executable code further causes the first zone server to exclude a UE in the first group of UEs for a period of time based on the UE moving to the first group of UEs from a second group of UEs.

15. The system of claim 10, wherein the first group of UEs comprises UEs that change between a first attribute corresponding to a second group of UE and a second attribute corresponding to a third group of UEs.

16. The system of claim 10, wherein the global model is updated based on the average of the model updates.

17. The system of claim 10, wherein execution of the first processor-executable code further causes the first zone server to receive, from the global server, a global averaged model based on transmitting the average of the model updates to the global server.

18. The system of claim 10, wherein execution of the first processor-executable code further causes the first zone server to generate a model update associated with the global model.

* * * * *